May 9, 1944.  L. HORNBOSTEL  2,348,345
PRESS ROLL DRIVE
Filed May 8, 1941  3 Sheets-Sheet 1
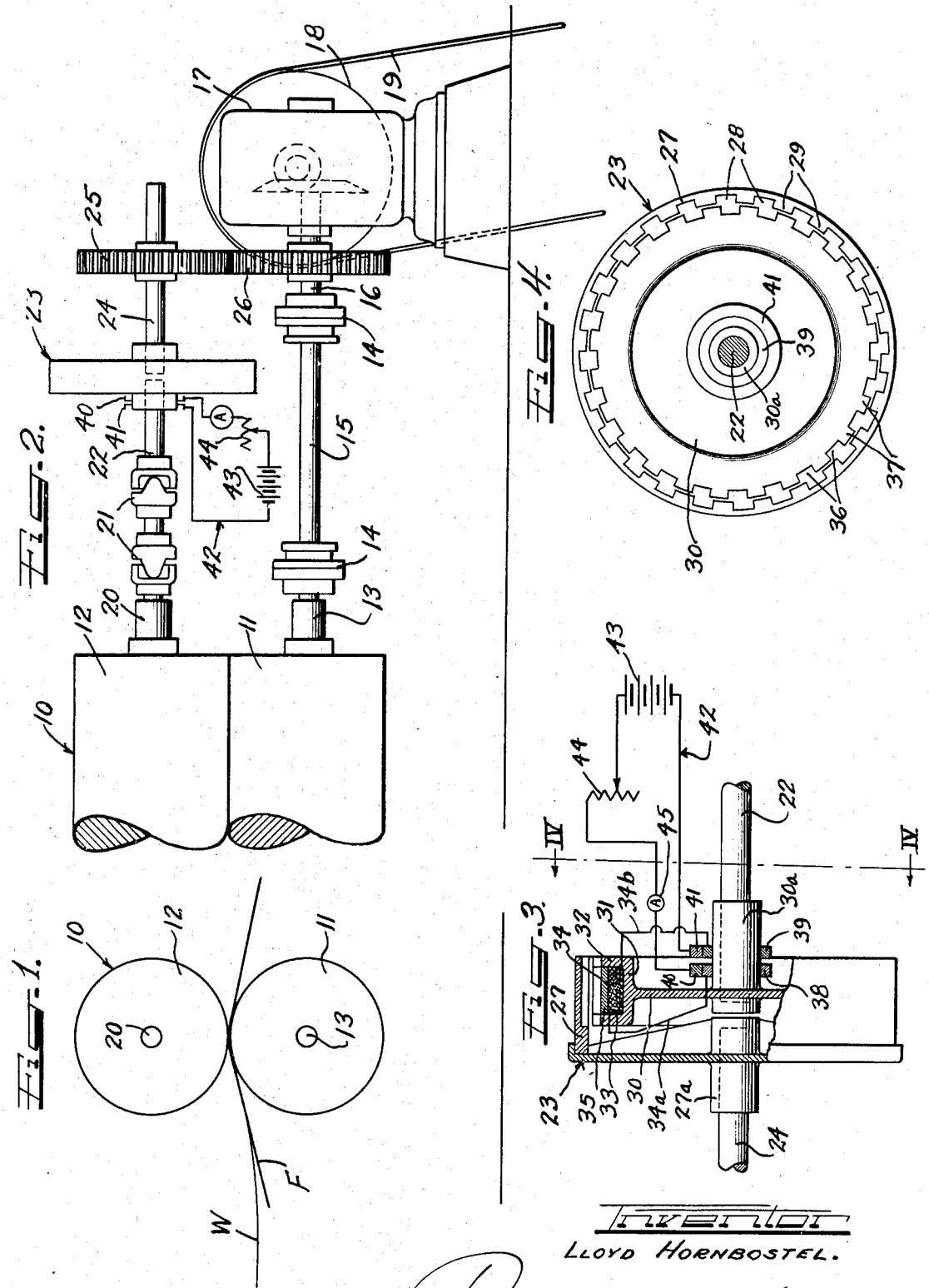
Inventor
LLOYD HORNBOSTEL.

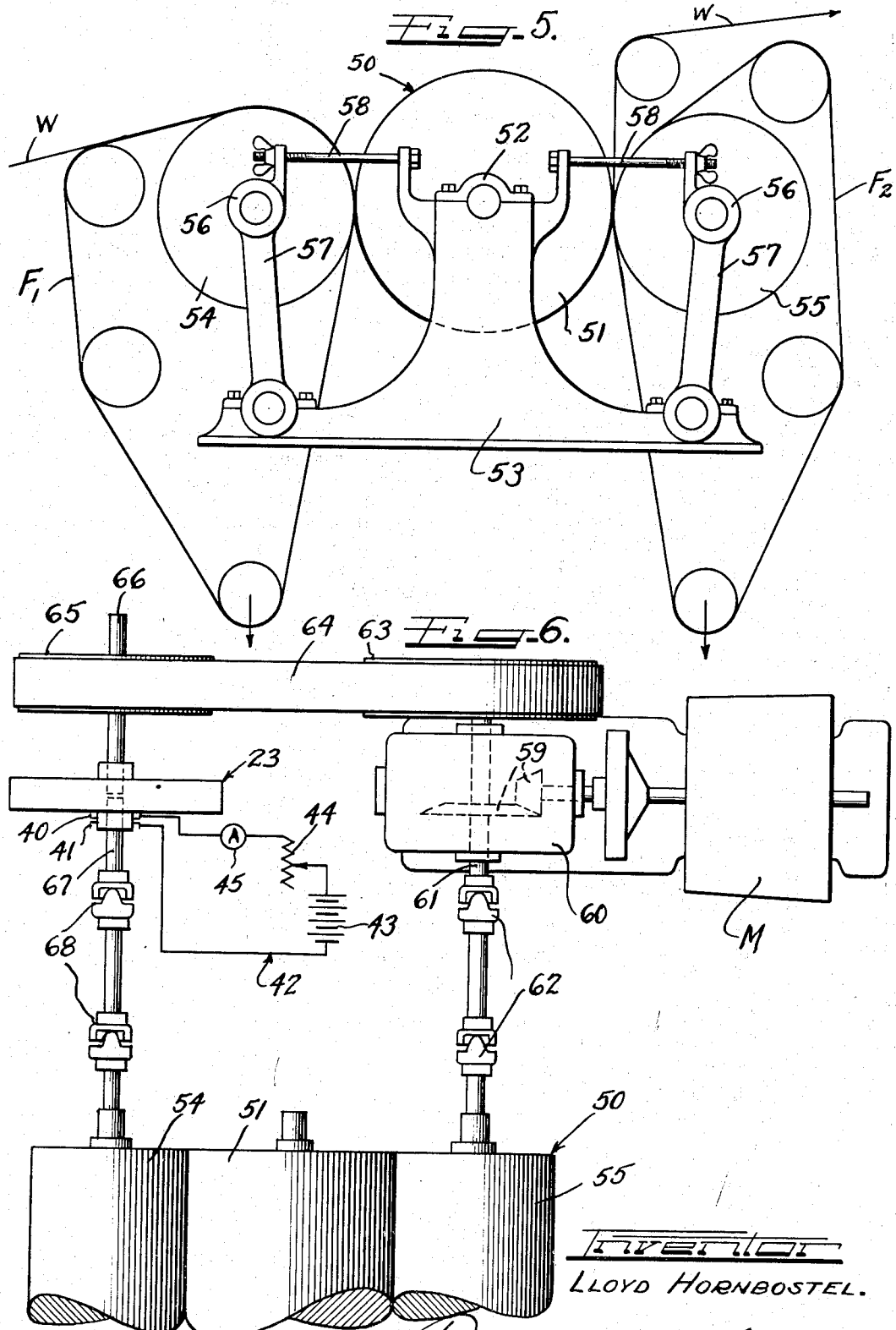

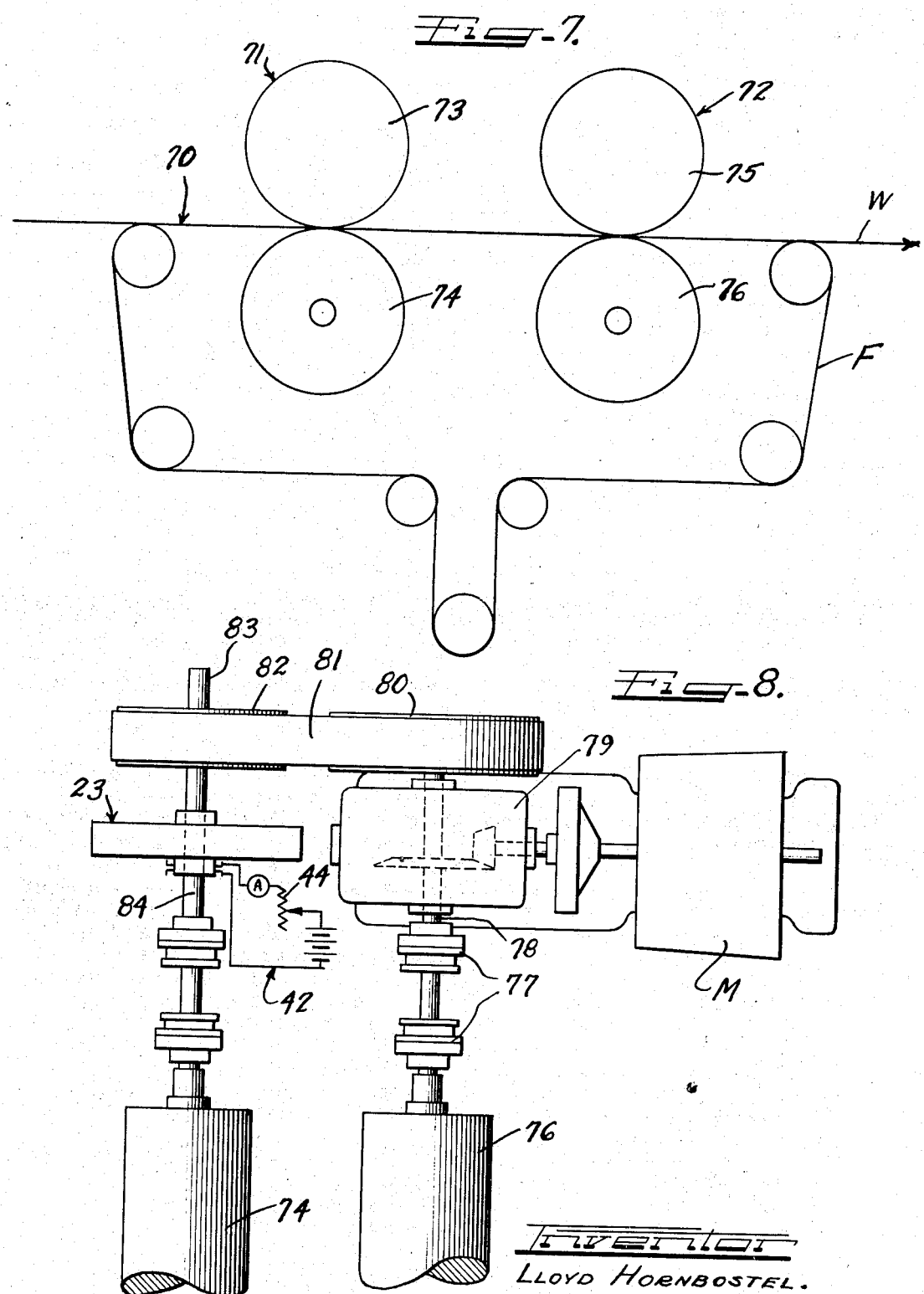

Patented May 9, 1944

2,348,345

UNITED STATES PATENT OFFICE 2,348,345

PRESS ROLL DRIVE

Lloyd Hornbostel, Beloit, Wis., assignor to Beloit Iron Works, Beloit, Wis., a corporation of Wisconsin Application May 8, 1941, Serial No. 392,443

2 Claims. (Cl. 92—49)

This invention relates to the driving of press rolls of a paper making machine to divide the driving effort going to cooperating or adjacent rolls so as to obtain any desired division of driving effort. More particularly, this invention relates to the tapping off of any desired amount of driving effort from one roll of the press roll assembly to help drive another roll of the assembly.

In accordance with this invention, one of the rolls of a press roll assembly is directly driven from a prime mover while one or more of the other rolls of the assembly, or of an adjacent assembly, is driven through an electric slip coupling having no rubbing parts and being controllable to vary the driving effort or shaft twist that goes through the coupling by a mere simple adjustment of the amount of current fed to the coupling.

It is thus now possible, in accordance with this invention, to positively drive the bottom roll of a two roll vertical press and to simultaneously supply the top roll of the press with any desired proportional amount of driving effort applied to the bottom roll, to directly drive an end roll of a three roll horizontal press assembly and to supply any amount of positive driving action to the other end roll of this assembly, or to positively drive one bottom roll of a vertical press while applying any desired amount of driving effort to an adjacent bottom roll of another vertical press acting on the same felt.

An important feature of this invention resides in the possible use of a slip coupling as a clutch permitting a cut-off of any of the clutch driven rolls. Thus, in the press roll drives of this invention electric slip couplings are provided to give a helping drive effect and to act as a cut-off coupling.

A feature of the coupling is that it has no rubbing or wearing parts and acts on a magnetic slip principle caused by inducement of a magnetic flux between the driving and driven parts. Excitation of the driven parts controls the degree of slippage. If the driven part is not excited or electrically energized, the part is uncoupled. If the driven part is partially energized the clutch will slip an amount directly dependent upon the degree of excitation. Even if the driven part is fully energized, some slippage will occur.

Another feature of the invention resides in the fact that increased loading of the clutch driven roll results in increased application of driving torque to the roll so that while the speed of the roll may slow down, the torque increases to compensate for the increased load. The faster the coupling slips, the more driving effort or shaft twist is transmitted.

Another feature of the press roll drives of this invention resides in provision of an electrical slip coupling to operate the coupling driven roll at a slower speed than the direct driven roll, so as to obtain an ironing or smoothing effect on the paper.

It is then an object of this invention to provide press roll drives for paper making machines enabling any desired division of driving effort to the press rolls.

Another object of the invention is to provide an electric slip coupling drive as a means to vary the speeds of press rolls.

A further object of the invention is to provide a helper drive for press roll assemblies which is simply regulated to vary the division of driving effort between the rolls.

A further object of this invention is to provide a press roll drive assembly utilizing electric slip couplings with no rubbing parts, both as helper drive units and as cut-off coupling units.

Other and further objects and features of the invention will be apparent to those skilled in the art from the following detailed description of the annexed sheets of drawings which, by way of preferred examples, illustrate three embodiments of the invention.

On the drawings:

Figure 1 is an end elevational, somewhat diagrammatic, view of a two roll vertical press assembly for a paper making machine;

Figure 2 is a fragmentary side elevational view of the two roll press shown in Figure 1 and illustrating the driving assembly in accordance with this invention;

Figure 3 is a side elevational view, with parts broken away and shown in vertical cross-section, of an eddy current slip coupling or dynamatic clutch used in the drive assembly shown in Figure 2;

Figure 4 is a view of the clutch taken along the line IV—IV of Figure 3;

Figure 5 is an end elevational, somewhat diagrammatic, view of a three roll horizontal press roll assembly for a paper making machine;

Figure 6 is a fragmentary top plan view of the three roll press assembly shown in Figure 5 and illustrating the drive for the first and third rolls of the assembly in accordance with this invention;

Figure 7 is an end elevational, somewhat diagrammatic, view of two adjacent presses of a paper machine; and Figure 8 is a fragmentary top plan view of the bottom rolls of the two adjacent presses shown in Figure 7 and illustrating the drive for said rolls in accordance with this invention.

As shown on the drawings:

In Figures 1 and 2, the reference numeral 10 designates generally a vertical press assembly composed of a bottom roll 11 and a cooperating top roll 12 with a felt F passing through the nip between the rolls for conveying a web W through the assembly. The bottom roll 11 has an axle 13 joined through couplings 14 and a shaft 15 to a drive shaft 16 projecting from a gear box 17. The drive shaft 16 of the gear box is actuated by a pulley 18 driven by a belt 19 from a prime mover (not shown). The top roll 12 has an axle 20 joined through universal joints 21 with a shaft 22 driven by the driven part of an electric slip coupling. The electric slip coupling, indicated generally by the reference numeral 23, is driven by a shaft 24. The shaft 24, in turn, is driven through gears 25 and 26 from the shaft 16 of the gear box.

In this manner the bottom roll 11 is directly coupled to a prime mover, while the top roll 12 is driven from the in-shaft to the bottom roll through an electric slip coupling which controls the amount of driving effort applied to the top roll.

As shown in Figures 3 and 4, the electric slip coupling 23 is composed of a metal armature drum 27 having interior transverse slots 28 in spaced relation around the inner periphery thereof to define inwardly projecting transverse teeth 29. The armature drum 27 has a hub 27a secured on the shaft 24.

A magnetic spider 30 is mounted within the armature drum 27 and has a hub 30a secured on the shaft 22.

The spider 30 has a rim portion 31 with upstanding end flanges 32 providing a chamber 33 in which is wound an annular coil 34 of wire. The coil 34 is covered with a non-magnetic plate 35, and the flanges 32 are transversely grooved as at 36 (Figure 4) to provide a plurality of radially extending transverse teeth 37 around the periphery of the spider. The teeth 37 on the spider and the teeth 29 on the armature drum do not engage.

A pair of electric slip rings 38 and 39 are mounted in insulated relation on the hub 30a of the spider. One end 34a of the coil is connected to the ring 38. The other end 34b of the coil is connected to the ring 39.

The rings 38 and 39 rotate with the spider, since they are fixedly secured on the hub thereof.

Brushes 40 and 41 contact the slip rings 38 and 39 in electrical contact therewith. These brushes 40 and 41 are stationary and are included in an electrical circuit 42 including a source 43 of direct current, a rheostat 44, and an ammeter 45.

The electric slip coupling or dynamatic clutch 23 thus contains no frictionally engaging coupling members. The coupling effect is obtained by energization of excitation of the coil 34 in the spider 30 to create a magnetic field around the coil 34. The magnetic field induces eddy currents in the armature drum and field when there is any relative movement between them. The degree of excitation of the coil determines the amount of slippage of the parts. When the coil is deenergized, the drum 27 will rotate freely around the spider without turning the spider therewith. When the coil is energized, the magnetic flux will drag the spider with the drum. However, a certain amount of slippage will always occur within the coupling, and the faster the coupling slips the more driving effort or torque is applied to the spider.

In the assembly shown in Figure 2, the top roll 12 can receive an amount of driving effort from the in-shaft to the bottom roll in accordance with the amount of energization or excitation of the coil in the slip coupling 23. The rheostat 44 can be set so that the roll 12 will operate at the same speed as the roll 11 or at a slower speed than the roll 11. In other words, a dragging effect can be maintained on the web W by driving the roll 12 slower than the roll 11. The roll 12 can be allowed to run free from any driving mechanism by merely deenergizing the coil in the slip coupling.

Therefore, in vertical press assemblies such as are shown in Figures 1 and 2, the present invention makes possible the direct driving of one of the rolls of the assembly and the application of any desired amounts of driving effort to the other roll of the assembly.

As shown in Figures 5 and 6, the horizontal press roll assembly 50, composed of a middle roll 51 rotatably mounted in fixed bearings such as 52 on a frame 53 and end rolls 54 and 55 on each side of the roll 51 rotatably mounted in bearings 56 on swingable arms 57 which are pivoted to the frame 53, receives a web W downwardly through the first nip between the rolls 51 and 54, thence around the bottom of the roll 51 and upwardly through the nip between the rolls 51 and 55.

Draw bolt means 58 are provided for swinging the rolls 54 and 55 against the middle roll 51 to bring all three rolls in substantial horizontal alignment and to create pressures in the nips between the rolls. Endless looped felts F1 and F2 are trained through the nips and around guide rolls for protecting the web against crushing in the nips.

As shown in Figure 6, a pulley M driven from a prime mover such as an electric motor (not shown) drives gears 59 in a gear box 60 to rotate an in-shaft 61 coupled through universal joints 62 with the third roll 55. The roll 55 is thus directly driven from the motor.

The in-shaft 61 projects through the other side of the gear box 60 to drive a pulley 63 for propelling a belt 64 to drive a pulley 65 on an auxiliary shaft 66. The auxiliary shaft 66 drives the armature drum of an electric slip coupling such as 23 described above. This electric slip coupling, in turn, drives a shaft 67 coupled through universal joints 68 to the first roll 54.

The electric slip coupling 23 in the drive assembly shown in Figure 6 therefore makes possible the adjustment of the amount of driving effort to the first roll 54 of the three roll press and also makes possible the use of the clutch as a cut off coupling if for any reason the rolls 51 and 55 of the press are to be used separately. While the third roll 55 is directly coupled to the motor and, in turn, serves to drive the rolls 51 and 54 through the nips, because of the nip engagement therebetween a certain amount of slippage would progressively occur and the first roll might have an undue dragging effect on the paper. The helper drive now provided makes it possible to accurately control the first roll from the third roll.

If the load on the first roll is changed due to a tightening up of the drawing means 58 to increase the nip pressure between the rolls, there would be a tendency to make the clutch slip faster, but at the same time the driving torque imparted to the roll would be increased. If it is then desired to bring the roll up to speed, all that is necessary is an adjustment of the rheostat 44 to decrease the slippage of the clutch.

In the embodiment shown in Figures 7 and 8, the reference character 70 designates generally a press roll section of a paper machine composed of two vertical presses 71 and 72. The vertical press 71 contains a top roll 73 and a bottom roll 74. The press 72 contains a top roll 75 and a bottom roll 76. A felt F is trained around guide rolls through both presses 71 and 72 to convey a web W through the presses.

As shown in Figure 8, the lower roll 76 of the second press 72 is coupled through couplings 77 with the in-shaft 78 of a gear box 79 which is driven by pulley M from a prime mover, (not shown). The shaft 78 extends through the other side of the gear box 79 and drives a pulley 80 connected through a belt 81 to a pulley 82 on a shaft 83 which drives the armature drum of an electric slip coupling or dynamatic clutch 23 such as is described above.

The clutch 23 in Figure 8, in turn, drives the in-shaft 84 to the bottom roll 74 of the first press 71. The amount of slippage in the clutch 23 is controlled by the excitation circuit 42.

The drive assembly illustrated in Figures 7 and 8 makes possible the driving of the first press 71 entirely by the felt F from the second press 72 by deenergizing the coil in the electric coupling 23 so as to uncouple the shafts 83 and 84 or any desired amount of driving effort can be applied to the first press 71 from the second press 72 by energizing the coil of the slip clutch any desired amount.

If the nap of the felt indicates that the first press 71 has an excessive dragging effect, the rheostat 44 controlling the excitation circuit can be reset to supply more current to the slip clutch coil thereby decreasing the slippage of the coil and speeding up the first press to the speed of the second press or any speed under the speed of the second press.

From the above descriptions, it will be clearly understood that the press roll drives of this invention all include electric slip couplings or dynamatic clutches operating on a direct current excitation principle for helping the drive of one roll from the drive of another roll or for uncoupling the helper drive.

I claim as my invention:

1. A drive assembly for the press rolls of a paper machine press of the type having press rolls in cooperating pressure driving relation which comprises an in-shaft directly driving one of said press rolls, an auxiliary shaft driven by said in-shaft, an eddy current electric slip clutch having a driving part driven by said auxiliary shaft and a driven part adapted to be driven by said driving part, a second in-shaft coupling the driven part of said clutch to another of said press rolls, said clutch having a coil associated therewith for inducing eddy currents between the driven and driving parts thereof, a direct current excitation circuit for energizing the coil of said clutch to induce eddy currents between the driving and driven parts thereof to drivingly couple said parts, and means for regulating the excitation of said coil to control the helper drive effort applied to said another of said press rolls from said one of said press rolls.

2. In a three roll horizontal press assembly for a paper machine including a rotatably mounted center roll, end rolls on each side of the center roll in pressure relation therewith for providing upward passage and downward passage nips, the improvement which comprises an in-shaft coupled to one of said end rolls, means for directly driving said in-shaft, a second in-shaft coupled to the other of said end rolls, an electric dynamic slip clutch driving said second in-shaft, means coupling said first in-shaft with said clutch to drive said second in-shaft through said clutch, said clutch having a coil associated therewith for inducing eddy currents between driven and driving parts thereof, a direct current energization circuit for said coil, and means for regulating current flow through said circuit for controlling slippage between the driven and driving clutch parts whereby any desired amount of helping effort can be applied from said first mentioned end roll to said last mentioned end roll.

LLOYD HORNBOSTEL